United States Patent
Baumgartner

(10) Patent No.: US 8,079,448 B2
(45) Date of Patent: Dec. 20, 2011

(54) AXLE SHAFT INCLUDING AN ELECTROMECHANICALLY OR PNEUMATICALLY ACTUATED DISC BRAKE

(75) Inventor: Johann Baumgartner, Moosburg (DE)

(73) Assignee: KNORR-BREMSE Systems fuer Nutzfahrzeuge GmbH, Munich (DE)

( * ) Notice: Subject to any disclaimer, the term of this patent is extended or adjusted under 35 U.S.C. 154(b) by 994 days.

(21) Appl. No.: 11/652,519

(22) Filed: Jan. 12, 2007

(65) Prior Publication Data

US 2007/0205062 A1  Sep. 6, 2007

Related U.S. Application Data

(63) Continuation of application No. PCT/EP2005/007383, filed on Jul. 8, 2005.

(30) Foreign Application Priority Data

Jul. 13, 2004 (DE) .......................... 10 2004 033 824

(51) Int. Cl.
 *F16D 65/38* (2006.01)
(52) U.S. Cl. .................................. 188/73.39; 188/73.31
(58) Field of Classification Search ............... 188/73.39, 188/71.1, 73.1, 73.2, 73.31, 73.35–73.37, 188/370, 205 R, 206 R, 210, 218 XL
See application file for complete search history.

(56) References Cited

U.S. PATENT DOCUMENTS

| 3,231,051 A | | 1/1966 | Harrison | |
| 3,375,906 A | | 4/1968 | Hayes | |
| 3,999,635 A | * | 12/1976 | Hotchkiss | 188/72.5 |
| 4,082,167 A | * | 4/1978 | Einchcombe et al. | 188/73.34 |
| 4,352,414 A | * | 10/1982 | Scott | 188/73.34 |
| 4,527,668 A | * | 7/1985 | Davidson | 188/73.38 |
| 6,705,439 B1 | * | 3/2004 | Wang | 188/340 |

FOREIGN PATENT DOCUMENTS

WO  WO 02/14708 A2  2/2002

OTHER PUBLICATIONS

International Search Report dated Oct. 18, 2005.

* cited by examiner

*Primary Examiner* — Xuan Lan Nguyen
(74) *Attorney, Agent, or Firm* — Crowell & Moring LLP

(57) ABSTRACT

An axle shaft includes an electromechanically or pneumatically actuated disc brake, especially for a useful vehicle. The brake disc and the caliper can be displaced in relation to each other, and the caliper is fixed to the axle shaft on at least two fixing plates extending preferably from the axle shaft in different directions, at at least respectively one fixing point. The axle shaft is characterized by the arrangement, especially the orientation and/or embodiment, of the fixing plates, and the fixing points of the caliper or of an optional brake carrier on the fixing plates, which is selected in such a way that there is either no displacement of the fixing points on the fixing plates or a parallel displacement of the fixing points on both fixing plates perpendicularly to the brake disc.

7 Claims, 6 Drawing Sheets

AXLE SHAFT INCLUDING AN ELECTROMECHANICALLY OR PNEUMATICALLY ACTUATED DISC BRAKE

CROSS-REFERENCE TO RELATED APPLICATIONS

This application is a continuation of PCT International Application No. PCT/EP2005/007383, filed on Jul. 8, 2005, which claims priority under 35 U.S.C. §119 to German Application No. 10 2004 033 824.8, filed Jul. 13, 2004, the entire disclosures of which are expressly incorporated by reference herein.

BACKGROUND AND SUMMARY OF THE INVENTION

The present invention relates to an axle shaft including an electromechanically or pneumatically actuated disc brake.

In known pressurized-air-actuated disc brakes, a braking operation is carried out by actuating the brake application device, for example, by way of a piston rod movement of a pneumatic brake cylinder. Via the piston rod, a connected brake lining is pressed against the brake disc. Depending on whether the disc brake is in the form of a fixed-caliper brake or a sliding- or pivoting-caliper brake (or as a combination of these types of brakes), either the brake disc is moved, in particular pushed, against the further brake lining on the other side of the brake disc and/or the further brake lining is moved, in particular pushed, against the brake disc.

One disadvantage is that a torque is produced about an axis of the disc brake during braking operations, and this leads to skewing of the brake caliper in relation to the brake disc.

An object of the invention is, therefore, initially to avoid this disadvantageous effect in a manner which is simple in terms of design.

This, and other, objects are achieved by providing an axle shaft including an electromechanically or pneumatically actuated disc brake, in particular for a commercial vehicle. The disc brake includes a brake caliper and a brake disc, the caliper surrounding at least portions of the outer circumference of the brake disc in a frame-like manner. A brake application device performs a brake application movement, and at least one adjusting device, preferably a plurality of adjusting devices, adjusts the air play between the brake pads and the brake disc on each side of the brake disc. The brake disc and the brake caliper move in relation to one another, and the brake caliper on the axle shaft is fixed to at least two fixing lugs, which preferably extend away from the axle shaft in different directions at at least one or more fixing points in each case. The fixing lugs and the fixing points of the brake caliper (or of an optional brake carrier formed on the fixing lugs) are oriented and/or formed such that there is either no displacement of the fixing points on the fixing lugs perpendicular to the brake disc or there is an identical parallel displacement of the fixing points on both fixing lugs perpendicular to the brake disc.

Advantageous refinements of the invention are described and claimed herein.

The present invention produces an arrangement and/or design of the fixing lugs and the fixing points of the brake caliper, or of an optional brake carrier, on the wheel lugs such that, during braking operations, there is either no displacement of the fixing points perpendicular to the brake disc on the fixing lugs or there is an identical parallel displacement of the fixing points perpendicular to the brake disc on both fixing lugs.

To this end, at least one, or both, of the fixing lugs is/are preferably oriented at the same angle or preferably at different angles to the brake disc or to the plane of the brake disc.

In this way, the invention initially eliminates the effect of the brake caliper becoming skewed during braking operations in a markedly simple and virtually cost-neutral manner, and independently of whether the caliper is in the form of a fixed caliper, a sliding caliper, or a pivoting caliper.

In the case of sliding—and pivoting-caliper designs, the invention prevents additional movement of the brake caliper, which results from the rotation of the fixing lugs (also see the detailed explanations of FIGS. 2 and 3, as well as 4).

However, the invention is furthermore also surprisingly suitable, given appropriate configuration, for producing a brake caliper which is preferably formed without sliding or rotary bearings, but which nevertheless is arranged on the axle shaft such that it can move in such a way that a displaceable brake disc can be dispensed with when a fixed-caliper design is used if adjusting devices are arranged on both sides of the brake disc. This omission of bearing elements both on the brake caliper and on the brake disc leads to a further considerable reduction in production costs.

This will be explained in greater detail in the text which follows.

In the case of fixed-caliper brakes with a brake application or actuating apparatus only on one side of the brake disc and adjusting devices on both sides of the brake disc, see, for example, WO 02/14708, a brake lining on the brake application side is first pressed against a brake disc and then the brake disc, which can preferably move in the axial direction but is mounted on a wheel hub or another component such that it transmits torque, is pressed against the further brake lining, which is preferably stationary in relation to the fixed caliper, as a result of axial displacement and so as to overcome air play. A feasible alternative/option is to form the fixed caliper such that it can perform micromovements itself in such a way that, during braking operations, it moves alone or in interaction with a moving brake disc such that the reaction forces are compensated for, or in such a way that there is sufficient relative movement between the fixed caliper and the brake disc to press the brake disc against the reaction-side brake lining too.

The relative movement between the brake disc and the caliper can be performed by an elastic movement, in particular pivoting, of the brake caliper on its fixture on the axle shaft of the wheel axle of the vehicle if the brake caliper is fixed to the axle shaft using lugs (or projections such as struts or the like), which move somewhat elastically under the action of the brake application forces.

One disadvantage of this solution is that a relatively high actuating force needs to be exerted on the brake disc on one side in order to move the brake caliper on the axle shaft, as a result of which the brake disc is loaded with axial forces, which often result in uneven loading and thus uneven wear of the brake linings on the brake application side and the reaction side of the brake disc.

In order to keep this uneven loading low, it is feasible to keep the brake fixing lugs very stiff in the circumferential direction, but to form them to be very resilient in the required movement direction parallel to the vehicle axle.

However, this is possible only to a relatively limited degree since the brake is also subjected to high lateral acceleration time and again during driving operation, and this can also lead to severe lateral vibration of the brake caliper in the case of an unstable fixing.

In contrast, an embodiment of the invention with a movable brake caliper on the axle shaft is fixed in a stable manner (in terms of fixing on the vehicle part) in such a way that impermissible lateral vibrations are prevented and wear on the brake disc and brake linings is as uniform as possible on the reaction side and the brake application side.

By suitably arranging the fixing points on the fixing lugs (by way of one or more fixing points or locations in each case), the tangential force acting on the fixing elements produces deliberate instances of deformation, which move the brake caliper toward the brake disc against the deformation resistance of the fixing elements on the reaction side of the brake disc.

Depending on the arrangement, the axial force which comes into effect is selected to be so great that the deformation resistances are overcome and also so great that the outer brake lining is actively pressed in the sense of self-reinforcement of the disc brake.

BRIEF DESCRIPTION OF THE DRAWINGS

An exemplary embodiment of the invention and a solution according to the prior art are described in greater detail in the text which follows with reference to the attached figures, in which.

DETAILED DESCRIPTION OF THE DRAWINGS

Figure 1:
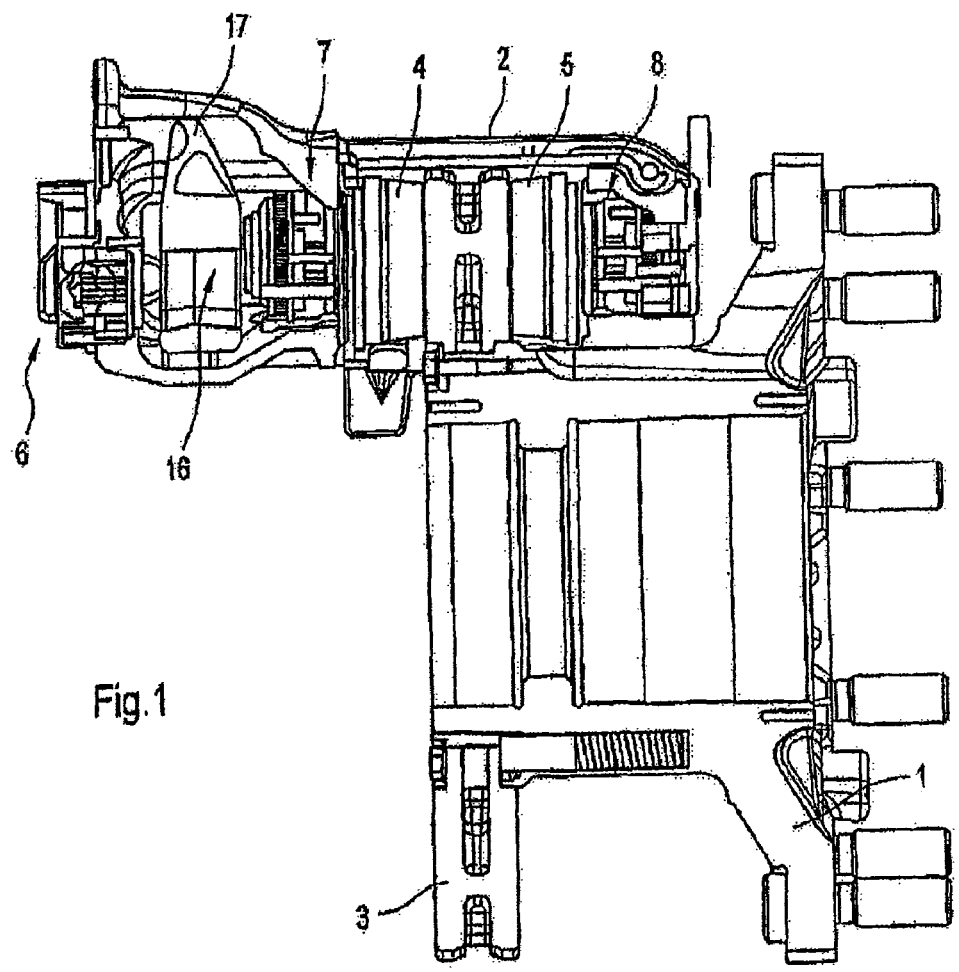
FIG. 1 is a schematic illustration of a disc brake including a pneumatically actuated brake application apparatus and electromotively actuated adjusting devices, which brake disc is suitable for an inventive arrangement on an axle shaft, for example in the manner of FIG. 4.

FIG. 1 illustrates a disc brake for commercial or utility vehicles, which disc brake has a brake caliper 2 which is in the form of a fixed caliper and engages over a brake disc 3, which can be displaced in the axial direction and is arranged in a rotationally fixed manner on a vehicle part, which is shown here in the form of a wheel hub 1. The brake caliper 2 is fixed to an axle flange of an axle such that it cannot move.

On one side of the brake disc, the brake has an associated electromechanical or pneumatic force-generating apparatus (in this case, a brake operating cylinder which is not shown here).

On one side of the brake disc, a brake application device 16 is arranged in the caliper 2, which brake application device 16 may be actuated in particular by a piston rod of the brake operating cylinder and has a rotary lever 17 which is eccentrically mounted in the caliper. The brake application device is formed and constructed in such a way that pressure pieces (not shown in detail here) on this side of the brake disc 3 (called the brake application side) are displaced parallel to the brake disc axis when the rotary lever 17 is pivoted and press a brake pad 4, which is arranged on the brake application side, against the brake disc 3, which is then displaced axially in the direction of the further brake pad on the other side of the brake disc (reaction-side) as the brake application movement continues. This occurs until the brake disc comes into contact with the further brake pad 5 and the actual braking action between the brake disc 3 and the brake pads 4, 5 comes into effect. On account of the frictional contact between the two brake pads 4, 5, the brake disc 3 and, with it, the wheel hub 1 and, respectively, a connected wheel (not illustrated) are braked. Reference is additionally made to WO 02/14708 with regard to functioning of an exemplary brake application device.

Both brake pads 4, 5, in each case, have at least one, and in particular in each case two, associated wear adjusting devices 7, 8 on the brake application side and on the reaction side, by which wear adjusting devices operation-related wear of the brake pads 4, 5 and disc can be compensated for, that is to say, by way of example, after each braking operation or after a plurality of braking operations, the brake pads 4, 5 are moved, by the magnitude of the wear thickness, in the direction of the brake disc 3. Here, the adjusting devices are electromechanically driven, with in each case one electric motor 6 being provided on each side of the brake disc (of which electric motors, the electric motor 6 on the brake application side is shown here). The electric motor 6 acts via a drive connection on rotary spindles or the like which, when rotated, change the axial position of the pressure pieces in relation to the brake disc 3. The advantage of these adjusting operations is, inter alia, the possibility of utilizing "intelligent" air play functions, which extend far beyond merely adjusting for wear of the brake.

In order to produce the relative movement between the brake caliper 2 and the brake disc 3, the brake disc is formed, according to FIG. 1, such that it can move by being displaced on an axle shaft. However, it is also feasible to arrange the brake caliper 2 on the axle shaft such that it can move. In principle, this can be done by way of a sliding or pivoting bearing, which is known per se. Solutions such as this are known from the prior art in an extremely wide variety of embodiments. However, since each bearing of this type requires additional outlay in terms of design and since the wear travel of the brake linings does not have to be bridged by moving the brake caliper on account of the arrangement of adjusting devices both on the brake application side and on the reaction side of the brake disc, it would be advantageous to bridge the operating stroke of the brake solely by "inherent" elastic movement of the brake caliper or else by elastic movements of the vehicle components, to which the brake is fixed. This would be done in such a way that, after the brake lining on one side of the brake disc is applied, the reaction-side brake pad is moved toward the brake disc 3, to be precise not with less force than the brake application-side brake pad 4 as far as possible.

The invention firstly provides a solution to this problem. Secondly, one aspect of the invention is also suitable for compensating for the effect of the caliper becoming skewed during braking operations in the case of disc-brake designs with conventional sliding, fixed or pivoting calipers.

Therefore, the situation for disc brakes according to the prior art, which are fixed to an axle shaft in a conventional manner, will first be explained in greater detail with reference to FIGS. 2 and 3.

Figure 2:
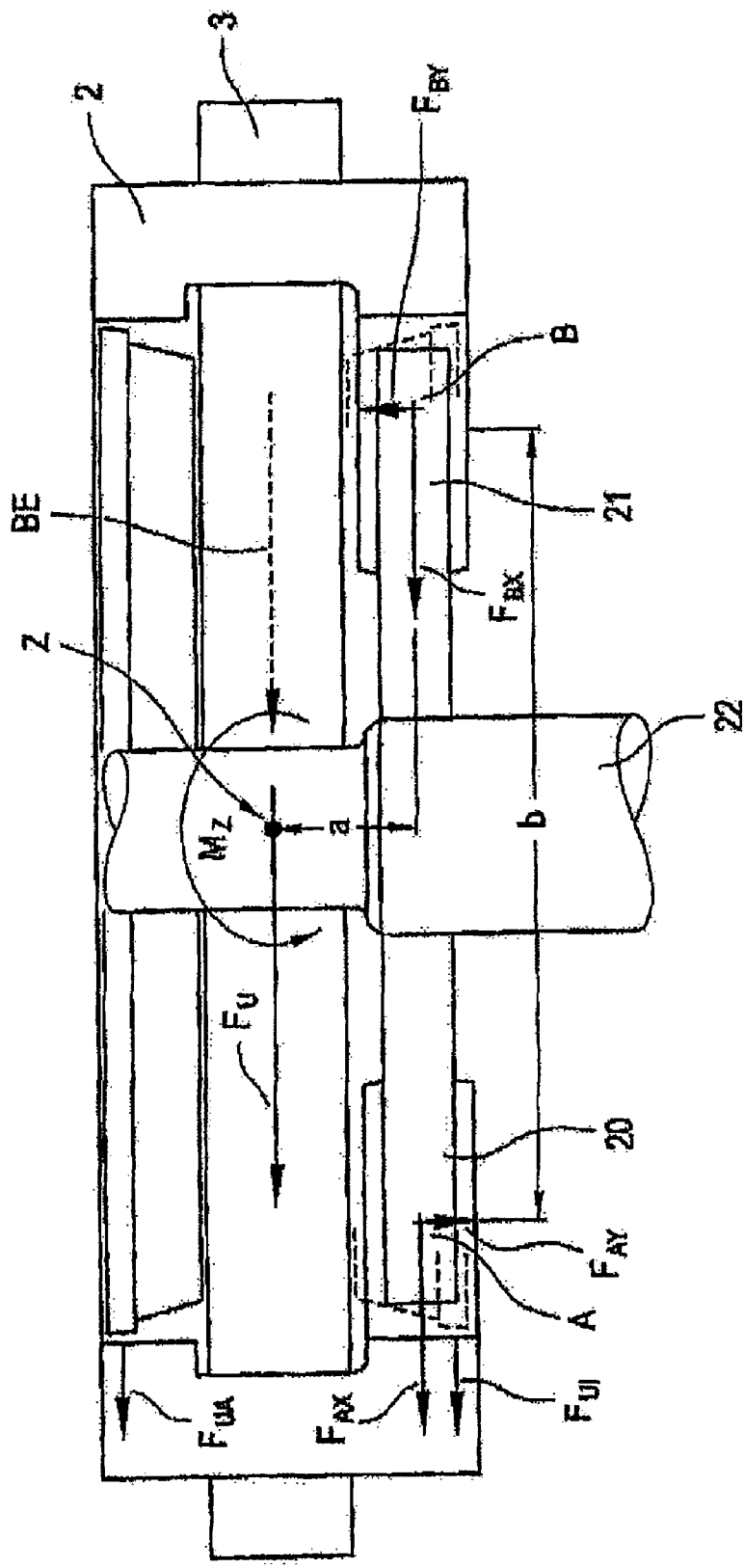
FIG. 2 is a plan view of a schematically illustrated brake caliper together with a brake disc on an axle shaft, of which a section is illustrated, in a first operating position between two braking operations.

The brake caliper 2 of FIG. 2 surrounds the brake disc 3 in a virtually frame-like manner, with the brake caliper being preferably arranged on its brake application frame side in a lower region on fastening lugs 20, 21. The fastening lugs 20, 21 are arranged on both sides of an axle shaft 22 (axle flange), and extend away from the axle shaft 22 in a substantially radial direction. The brake caliper is fixed, for example by use of one or more screw bolts, a welding zone, or by use of an articulated fixing device, at fixing points A and B, which are each at a distance "b/2" from the center axis of the axle shaft 22 and at a distance "a" from the center plane BE of the brake disc (the center plane being perpendicular to the axis of rotation of the brake disc 3).

The brake disc 3 rotates in the indicated direction of rotation, as a result of which a tangential force $F_U$ (here to the left) is produced during braking operations on account of the distance a of the fixing points A, B from the center plane BE.

Specifically, $$F_U = F_{UA} + F_{UI} = F_{AX} + F_{BX}$$

where $F_{UA}$=tangential force on the outside or reaction side of the brake lining, and $F_{UI}$=tangential force on the inside or brake application side of the brake lining, and $F_{AX}$=force at the fixing point A in the X-direction (parallel to the brake disc)

$F_{BX}$=force at the fixing point B in the X-direction (parallel to the brake disc)

$M_Z = F_U * a = F_{AY} * b = F_{BY} * b$ $F_{AY}$=force at the fixing point A in the Y-direction ("brake application direction" perpendicular to the brake disc)

$F_{BY}$=force at the fixing point B in the Y-direction ("brake application direction" perpendicular to the brake disc)

where $$|F_{AY}| = |F_{BY}| = F_U * a/b$$

This formulaic approach shows that a torque $M_Z$ is also produced about the vertical axis Z of the disc brake on account of the distance "a" with which the resulting tangential force $F_U$ acts at the fixing points "A" and "B".

The torque produces a pair of forces $F_{AY}$, $F_{BY}$ at the fixing points A and B, with which pair of forces the torque $M_Z$ on the axle shaft is supported.

Figure 3:
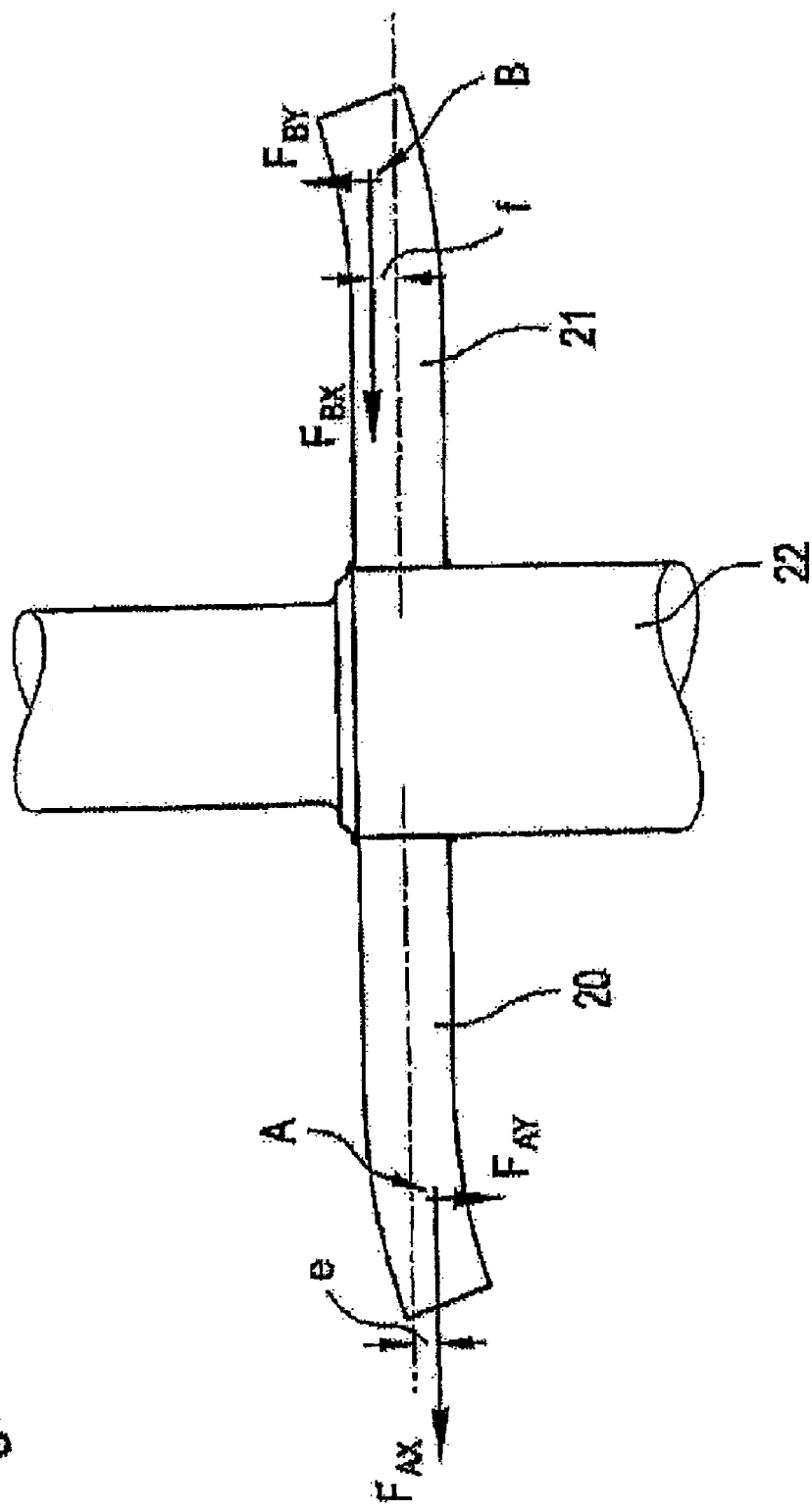
FIG. 3 is a plan view of the axle shaft, of which a section is illustrated, in a second operating position during a braking operation.

The forces resulting from the torque produce bending moments on the fixing lugs 20, 21 which, on account of the opposing force direction, also produce deformations oriented in the opposite direction, with the result that the brake caliper 2 becomes skewed in relation to the brake disc 3 since the fixing point A moves away from the brake disc while the fixing point B moves toward the brake disc 3 (see FIG. 3).

This disadvantageous effect leads to uneven wear of the brake linings and brake pads 4, 5 and to additional mechanical loading of the brake disc 3. The disadvantageous effect is known from practice to a person skilled in the art of brakes. The invention counteracts this disadvantageous effect in a simple and advantageous manner.

Figure 4:
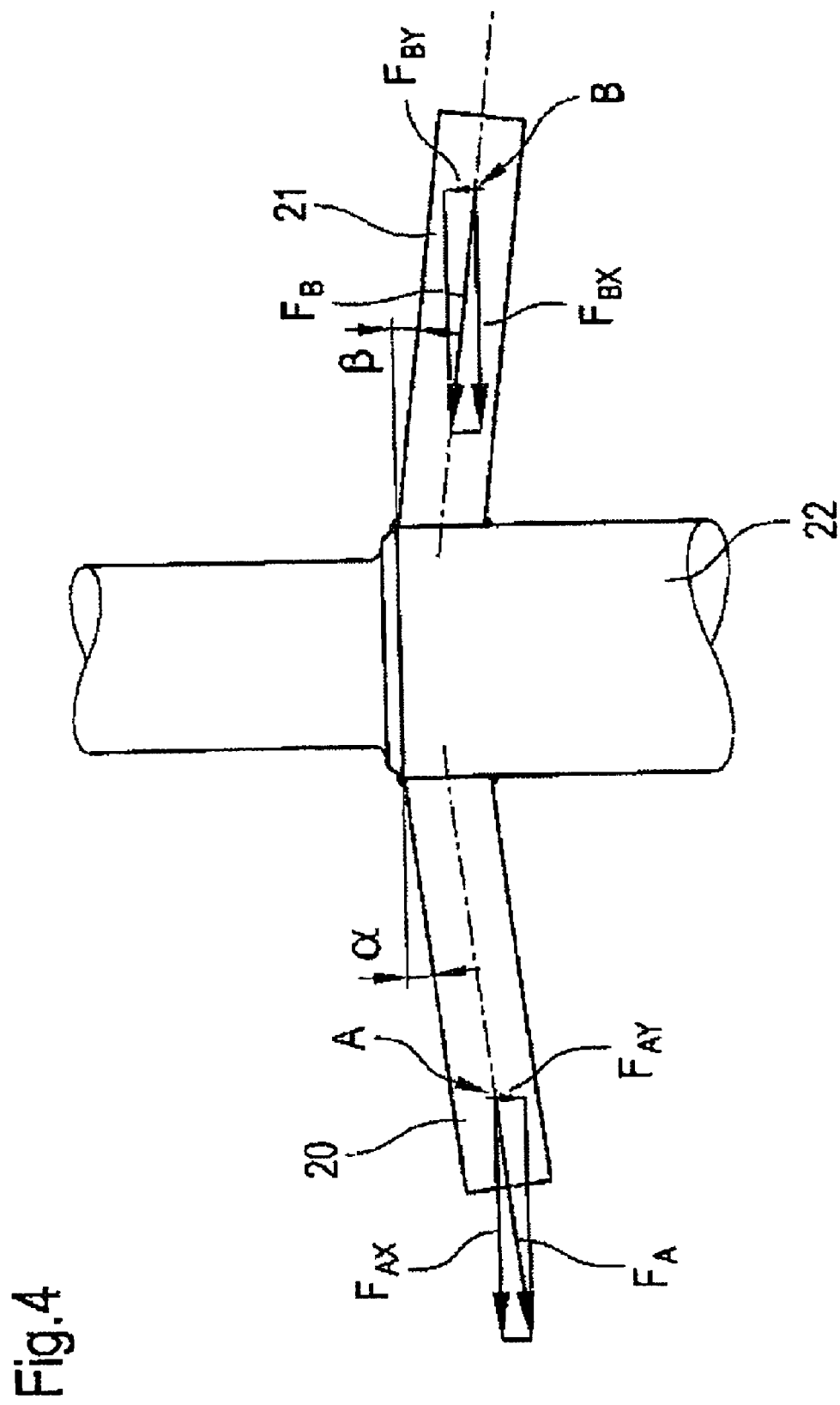
FIG. 4 illustrates a first inventive axle shaft for a disc brake.

FIG. 4 shows one embodiment of the invention for completely or at least largely preventing this effect.

Here, the fixing lugs 20, 21 on the brake carrier are, in each case, oriented at an angle to the brake disc 3 such that their orientation or extent corresponds to the direction of the resulting force vectors $F_A$, $F_B$. In other words: according to FIG. 4, the direction of action of the resulting $F_A$ and $F_B$ on the lugs 20, 21 in each case matches the orientation of the fixing lugs 20, 21 on which in each case only a tensile load (lug 20 with the fixing point A) or a pressure load (lug 21 with the fixing point B) acts during braking operations. The fixing lugs are, therefore, entirely or in any case substantially free of bending moments.

A design such as this is suitable for avoiding the effect described with regard to FIG. 3 in an extremely simple manner virtually without any increase in the costs of producing the axle or brake structure.

Figure 5:
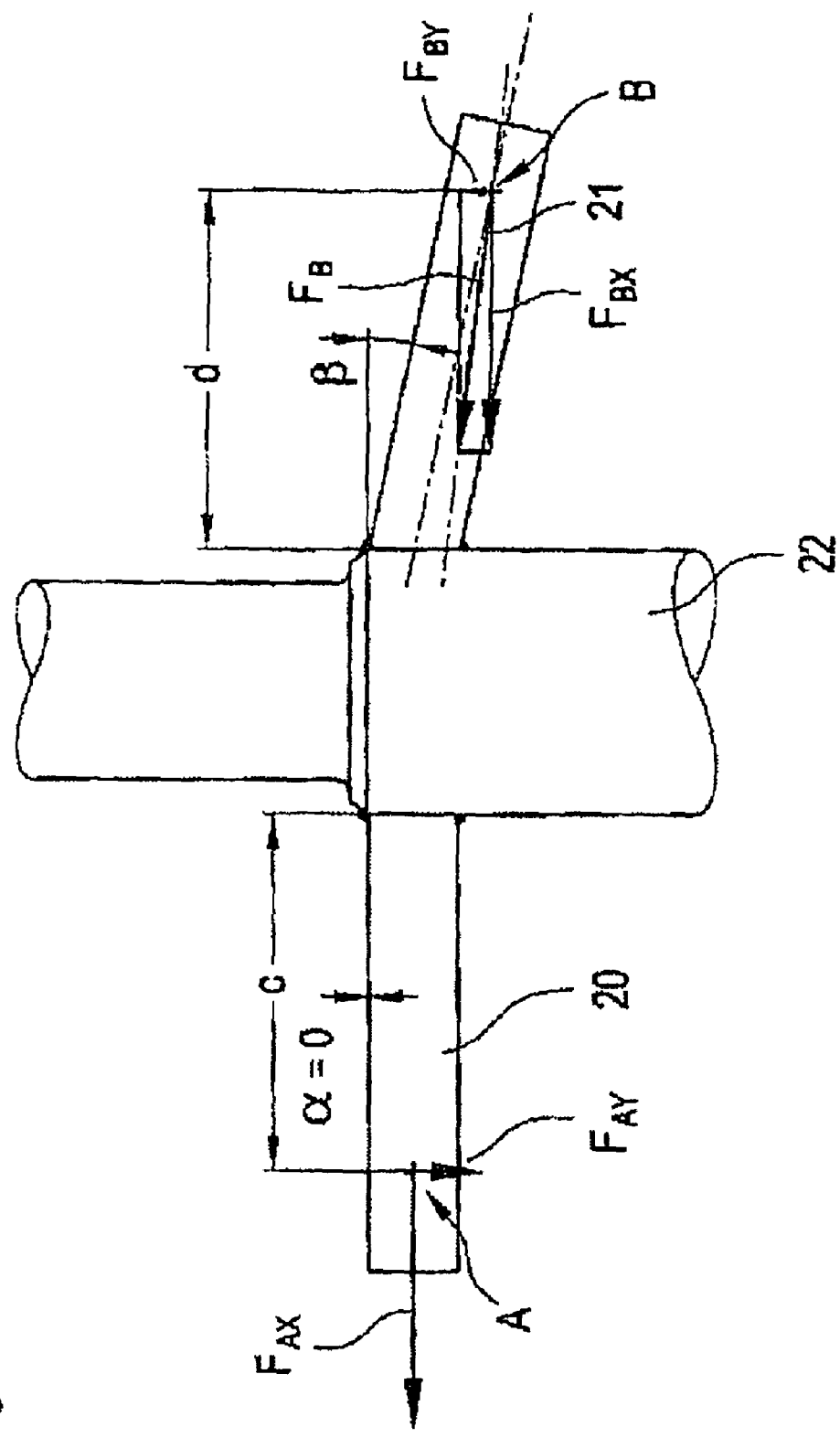
FIG. 5 illustrates a further inventive axle shaft in a first operating position between braking operations.
Figure 6:
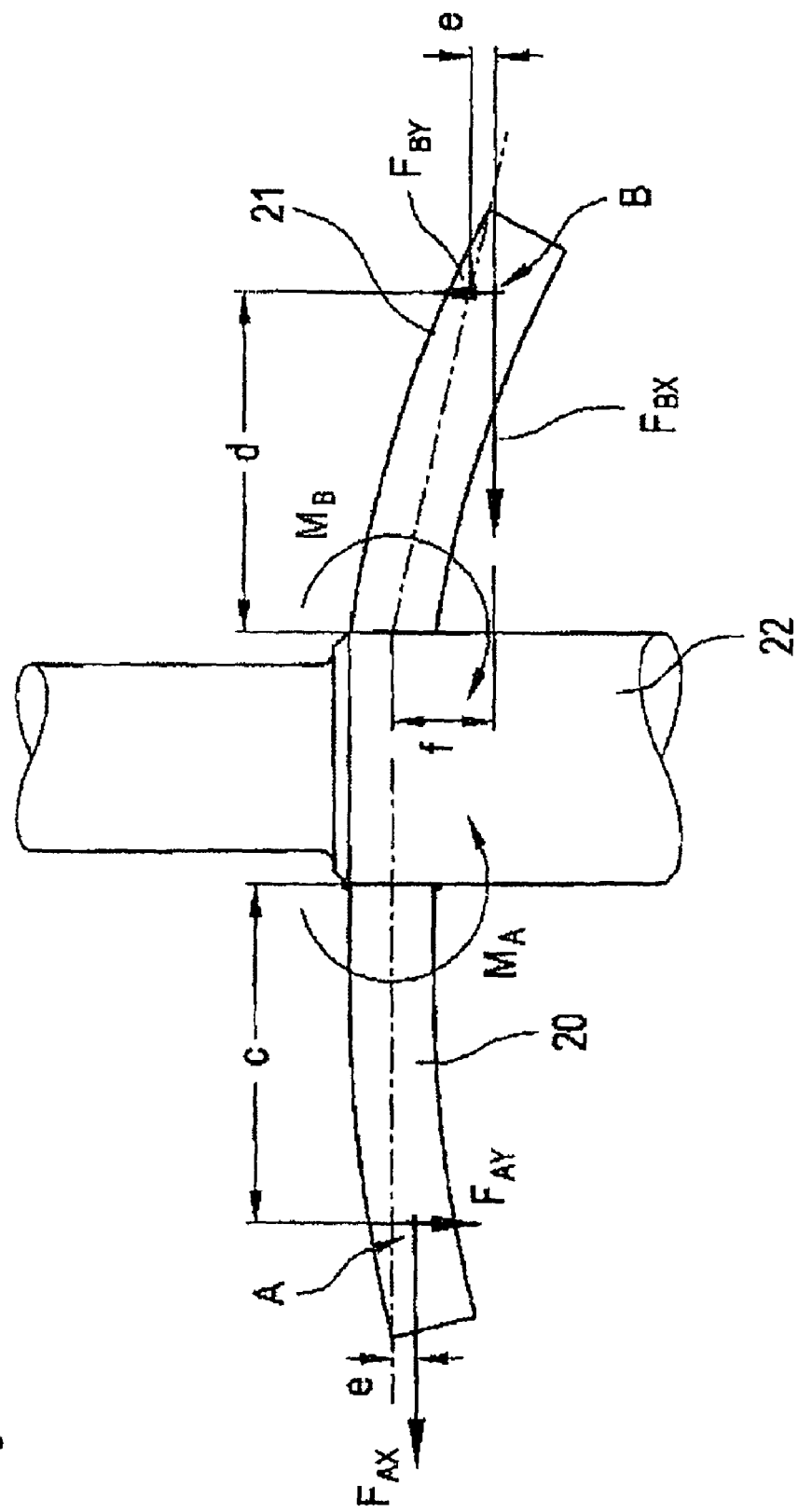
FIG. 6 illustrates the axle shaft from FIG. 5 during a braking operation.

The structure according to FIGS. 5 and 6 goes one step further. In these cases, the setting angles alpha (α) and beta (β) of the lugs 20, 21 are selected in relation to the brake disc such that the bending moments acting on the lugs are of equal magnitude.

This results in rectified displacement of the two fixing points A and B in the Y-direction by a distance "e".

Therefore, the brake caliper 2 may be moved solely by suitable selection of the setting angles α and β, which movement may be used, for example, to apply the reaction-side brake lining of a disc brake having adjusting devices to both sides of the brake disc in order to thus bridge half the operating stroke.

$$M_A = M_B$$

$$F_{AY} * c - F_{AX} * e = F_{BX} * f - F_{BY} * d$$

where:

c: distance between the fixing point A and the axle shaft surface 23 d: distance between the fixing point B and the axle shaft surface 23 f: difference between the distances of the fixing points A and B from the brake disc 3 e: distance moved by the points A, B during the braking operation

According to FIG. 5, the fixing points A and B are therefore arranged on the lugs 20, 21 in such a way that the tangential force acting at point B exerts a bending load, which opposes the force $F_{BY}$, on the lug B.

In this case, the condition which describes the formulaic approach specified under FIG. 5 must be satisfied, that is to say the bending moments exerted on the two fixing lugs must be of as equal magnitude as possible by suitable design, orientation and arrangement of the fixing lugs 20, 21 and of the fixing points A, B on the fixing lugs 20, 21, and thus be formed in such a way that the brake frame and caliper are displaced in parallel.

The magnitude e of the displacement of the fixing points (and of the brake linings) can be freely selected within relatively wide limits as desired by corresponding selection of the setting angles and of the design of the fixing lugs.

Sliding or pivoting bearings on the caliper can be completely dispensed with, although, in principle, they may alternatively/optionally be realized within the scope of the inventive concept.

TABLE OF REFERENCE SYMBOLS

1. Wheel hub
2. Brake caliper
3. Brake disc
4. Brake pad
5. Brake pad
6. Electric motor
7. Adjusting device
8. Adjusting device
16. Brake application apparatus
17. Rotary lever
22. Axle Shaft The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mounting arrangement for a disc brake, having a caliper and brake disc, on a vehicle axle, the disc brake being subject to forces tending to skew the caliper relative to the brake disc during operation, the mounting arrangement comprising:
   at least two fixing lugs operatively configured to extend radially from the vehicle axle in different directions, each lug providing a respective fixing point, wherein the respective fixing points secure a component of the disc brake to the two fixing lugs;
   wherein at least one of the fixing lugs is oriented to extend radially at an angle relative to a plane of the brake disc, said angle of the at least one fixing lug and an orientation relative to the plane of the brake disc of the other fixing lug being operatively defined to arrange the fixing points at defined locations, wherein the defined locations of the fixing points allow the fixing lugs to substantially counteract the forces tending to skew the caliper relative to the brake disc during operation.

2. The mounting arrangement according to claim 1, wherein both fixing lugs are oriented at an angle relative to a plane of the brake disc.

3. The mounting arrangement according to claim 1, wherein the two fixing lugs are oriented at different angles relative to a plane of the brake disc.

4. The mounting arrangement according to claim 1, wherein the two fixing lugs are each oriented at an angle to a plane of the brake disc such that the orientations correspond to a direction of force vectors, which result from braking operations at the fixing points, wherein in each only a tensile load or a pressure load acts on the fixing lugs and the fixing lugs are substantially free of bending moments.

5. The mounting arrangement according to claim 1, wherein bending moments exerted on the two fixing lugs are of substantially equal magnitude due to the design and orientation of the fixing lugs and the fixing points, wherein the fixing points are displaced in parallel during braking operation.

6. The mounting arrangement according to claim 1, wherein the component of the disc brake is one of a caliper or carrier for the caliper.

7. A process for making a mounting arrangement for a disc brake having a caliper and a brake disc, the caliper being mounted to a vehicle axle via at least two fixing points, each fixing point being formed on a respective fixing lug which extends radially away from the vehicle axle in different directions, the method comprising the acts of:
   determining skewing forces which would occur during operation of the disc brake to cause skewing of the caliper relative to the brake disc;
   determining an orientation of the fixing lugs extending radially from the axle shaft at an angle relative to a plane of the brake disc that will counteract the skewing forces based on a location of the fixing points; and
   forming the mounting arrangement with the fixing lugs having the determined orientation.

* * * * *